United States Patent
Turnquist et al.

(10) Patent No.: US 7,909,335 B2
(45) Date of Patent: *Mar. 22, 2011

(54) RETRACTABLE COMPLIANT PLATE SEALS

(75) Inventors: Norman A. Turnquist, Sloansville, NY (US); Frederick G. Baily, Ballston Spa, NY (US); Bernard A. Couture, Jr., Schenectady, NY (US); Jason P. Mortzheim, Gloversville, NY (US); Sean D. Feeny, Ballston Spa, NY (US); William E. Adis, Scotia, NY (US); Shorya Awtar, Ann Arbor, MI (US); Nikhil K. Verma, Bangalore (IN)

(73) Assignee: General Electric Company, Schenectady, NY (US)

( * ) Notice: Subject to any disclaimer, the term of this patent is extended or adjusted under 35 U.S.C. 154(b) by 383 days.

This patent is subject to a terminal disclaimer.

(21) Appl. No.: 12/025,097

(22) Filed: Feb. 4, 2008

(65) Prior Publication Data
US 2009/0196742 A1 Aug. 6, 2009

(51) Int. Cl.
*F16D 11/02* (2006.01)
(52) U.S. Cl. ...................................... 277/355
(58) Field of Classification Search .......... 277/411–413, 277/355
See application file for complete search history.

(56) References Cited

U.S. PATENT DOCUMENTS

| | | |
|---|---|---|
| 1,996,779 A | 4/1935 | Wheeler |
| 4,436,311 A | 3/1984 | Brandon |
| 4,526,509 A | 7/1985 | Gay, Jr. et al. |
| 5,002,288 A | 3/1991 | Morrison et al. |
| 5,135,237 A * | 8/1992 | Flower .......................... 277/355 |
| 5,395,124 A | 3/1995 | Brandon |
| 5,474,306 A | 12/1995 | Bagepalli et al. |
| 5,603,510 A | 2/1997 | Sanders |
| 5,709,388 A | 1/1998 | Skinner et al. |
| 5,749,584 A | 5/1998 | Skinner et al. |
| 5,755,445 A | 5/1998 | Arora |
| 5,810,365 A | 9/1998 | Brandon et al. |
| 5,961,280 A | 10/1999 | Turnquist et al. |
| 5,971,400 A | 10/1999 | Turnquist et al. |
| 6,010,132 A | 1/2000 | Bagepalli et al. |

(Continued)

FOREIGN PATENT DOCUMENTS
EP 0 391 676 B1 8/1994
(Continued)

OTHER PUBLICATIONS

Nakane, H. et al., "The Development of High Performance Leaf Seals," Proceedings of ASME Turbo Expo 2002, Jun. 3-6, 2002, Amsterdam, Netherlands, pp. 1-9.

(Continued)

*Primary Examiner* — Vishal Patel
(74) *Attorney, Agent, or Firm* — Nixon & Vanderhye P.C.

(57) ABSTRACT

A seal arrangement for sealing the space between a rotating element and a stationary element, the sealing arrangement comprising a compliant plate seal housing supported adjustably in the stationary element, the compliant plate seal housing supporting a compliant plate seal; and a spring system provided between the compliant plate seal housing and the stationary element to bias the compliant plate seal housing in a direction away from a surface of the rotating element. Alternatively, or additionally, one or more actuators may be provided to move the compliant plate seal housing in a direction away from a surface of the rotating element.

18 Claims, 11 Drawing Sheets

U.S. PATENT DOCUMENTS

| | | |
|---|---|---|
| 6,022,027 A | 2/2000 | Chevrette et al. |
| 6,027,121 A | 2/2000 | Cromer et al. |
| 6,030,175 A | 2/2000 | Bagepalli et al. |
| 6,065,754 A | 5/2000 | Cromer et al. |
| 6,131,910 A | 10/2000 | Bagepalli et al. |
| 6,139,018 A | 10/2000 | Cromer et al. |
| 6,220,602 B1 | 4/2001 | Webster et al. |
| 6,250,641 B1 * | 6/2001 | Dinc et al. .................... 277/355 |
| 6,257,586 B1 | 7/2001 | Skinner et al. |
| 6,267,381 B1 | 7/2001 | Wright |
| 6,318,728 B1 | 11/2001 | Addis et al. |
| 6,343,792 B1 | 2/2002 | Shinohara et al. |
| 6,428,009 B2 | 8/2002 | Justak |
| 6,502,823 B1 | 1/2003 | Turnquist et al. |
| 6,553,639 B2 | 4/2003 | Hobbs et al. |
| 6,572,115 B1 | 6/2003 | Sarshar et al. |
| 6,644,667 B2 | 11/2003 | Grondahl |
| 6,651,986 B2 | 11/2003 | Chevrette et al. |
| 6,695,316 B2 | 2/2004 | Popa et al. |
| 6,715,766 B2 | 4/2004 | Kirby, III et al. |
| 6,786,487 B2 | 9/2004 | Dinc et al. |
| 6,786,488 B2 | 9/2004 | Laurello et al. |
| 6,840,519 B2 | 1/2005 | Dinc et al. |
| 6,860,484 B2 | 3/2005 | Urlichs |
| 6,874,788 B2 | 4/2005 | Kono |
| 6,935,631 B2 | 8/2005 | Inoue |
| 6,976,680 B2 | 12/2005 | Uehara et al. |
| 7,032,903 B1 | 4/2006 | Dalton et al. |
| 7,066,468 B2 * | 6/2006 | Uehara et al. ................. 277/355 |
| 7,159,872 B2 | 1/2007 | Nicholson et al. |
| 7,201,378 B2 | 4/2007 | Kono |
| 7,226,053 B2 | 6/2007 | Nakano et al. |
| 7,229,246 B2 | 6/2007 | Ghasripoor et al. |
| 7,344,357 B2 | 3/2008 | Couture, Jr. et al. |
| 7,419,164 B2 | 9/2008 | Awtar et al. |
| 2003/0062686 A1 * | 4/2003 | Uehara et al. ................. 277/411 |
| 2004/0256810 A1 | 12/2004 | Nakano et al. |
| 2005/0194745 A1 | 9/2005 | Hogg |
| 2006/0033285 A1 | 2/2006 | Nishimoto et al. |
| 2006/0208427 A1 | 9/2006 | Wright et al. |
| 2006/0210392 A1 | 9/2006 | Enderby |
| 2007/0018408 A1 | 1/2007 | Kono |
| 2007/0120329 A1 | 5/2007 | Chevrette |
| 2007/0132192 A1 | 6/2007 | Chevrette |
| 2007/0237623 A1 | 10/2007 | Adis |
| 2007/0237628 A1 | 10/2007 | Adis |
| 2007/0257445 A1 | 11/2007 | Mortzheim et al. |
| 2007/0274829 A1 | 11/2007 | Chevrette et al. |
| 2007/0296159 A1 | 12/2007 | Feeny |
| 2008/0007009 A1 * | 1/2008 | Williams .................... 277/355 |
| 2008/0042365 A1 | 2/2008 | Awtar et al. |
| 2008/0042367 A1 | 2/2008 | Chevrette |
| 2008/0061513 A1 * | 3/2008 | Awtar et al. .................. 277/355 |
| 2008/0107525 A1 | 5/2008 | Adis et al. |
| 2008/0131269 A1 | 6/2008 | Deo et al. |
| 2008/0169614 A1 | 7/2008 | Awtar et al. |
| 2008/0169616 A1 | 7/2008 | Awtar et al. |
| 2009/0304493 A1 | 12/2009 | Awtar |
| 2009/0309311 A1 | 12/2009 | Verma et al. |
| 2010/0143102 A1 | 6/2010 | Deo et al. |

FOREIGN PATENT DOCUMENTS

| | | |
|---|---|---|
| EP | 1 235 009 A2 | 8/2002 |
| EP | 1 302 708 A2 | 4/2003 |
| EP | 0 933 567 B1 | 11/2006 |
| EP | 1 479 952 B1 | 1/2007 |
| FR | 2 650 048 A1 | 1/1991 |

OTHER PUBLICATIONS

Nakane, H. et al., "The Development of High-Performance Leaf Seals," Transactions of the ASME, Journal of Engineering for Gas Turbines and Power, vol. 126, Apr. 2004, pp. 342-350.

Watanabe, E. et al., "Development of New High Efficiency Steam Turbine," Mitsubishi Heavy Industries, Ltd., Technical Review, vol. 40, No. 4, Aug. 2003, pp. 1-6.

* cited by examiner

RETRACTABLE COMPLIANT PLATE SEALS

The present invention relates to retractable compliant plate seals. In particular, the present invention relates to retractable compliant plate seals for use in turbo-machinery.

BACKGROUND OF THE INVENTION

Compliant plate seals are used to provide dynamic sealing between a rotor, for example a rotating shaft, and a stator, for example a static shell, casing or housing. Compliant plate seals are used in turbo-machinery to provide good sealing, non-contacting operation and high pressure capability. Examples of compliant plate seals are disclosed, for example, in U.S. Pat. Nos. 6,343,792 and 6,976,680.

In the leaf seal design discussed above, the geometry requires that if the leaves are packed tightly at the tips, gaps will remain between the leaves close to the seal root. These gaps offer an increased leakage path from the high pressure side to the low pressure side of the seal.

It is also known to radially position seal segments in a circumferential array between the rotor and the surrounding casing of the turbine to minimize leakage. Labyrinth packing rings and springs holding the segments radially inward against surfaces on the casing to establish radial clearance between the seal and the rotor are conventionally used to allow segments to move radially outward in the event of rotor contact. However, labyrinth seal performance degrades over time as a result of transient events in which the stationary and rotating components interfere, rubbing the labyrinth teeth and permanently opening the seal clearance. It is known to reduce the degradation due to rubbing by employing "positive pressure" variable clearance labyrinth packings in which springs are used to hold the packing ring segments open under the no or low flow conditions when such rubbing is most likely to occur. Ambient pressure forces overcome the springs at higher loads acting to close the rings to a close running position. Such variable clearance positive pressure packings are disclosed, for example, in U.S. Pat. Nos. 6,715,766 and 6,695,316.

Adjustable seals are also known that utilize a series of high pressure fluidic actuators to move the seal segments away from the rotor in case of imminent seal/rotor rub. An external high pressure air supply and control system is provided that feeds high pressure actuation fluid into the actuators. The actuators are disposed between the stator, for example, the packing casing, and the seal segments, for example, the packing ring segments, such that pressurization of the actuators leads to the opening or retraction of the seal segments. In the absence of actuator pressurization, ambient pressure in the machine forces the seal segments to close. Examples of such adjustable seals include, for example, U.S. Pat. Nos. 6,502,823 and 6,786,487.

During periods of turbine startup and shutdown, there is minimal, or no, pressure drop across the seal, and the compliant plate seals must rely on hydrodynamic lift for non-contact operation. Contact between the compliant seal and the rotor causes seal and rotor wear, heat generation, and rotor-dynamic instabilities.

BRIEF DESCRIPTION OF THE INVENTION

In one embodiment of the invention, a seal arrangement for sealing the space between a rotating element and a stationary element comprises a compliant plate seal housing supported adjustably in the stator, the compliant plate seal housing supporting a compliant plate seal; and a spring system provided between the compliant plate seal housing and the stationary element to bias the compliant plate seal housing in a direction away from a surface of the rotating element.

In another embodiment of the invention, a seal arrangement for sealing the space between a rotating and a stationary element comprises a compliant plate seal housing supported adjustably in the stationary element, the compliant plate seal housing supporting a compliant plate seal; and an actuator provided between the compliant plate seal housing and the stationary element to move the compliant plate seal housing in a direction away from a surface of the rotating element in case of imminent seal-rotor interference.

DETAILED DESCRIPTION OF THE INVENTION

Figure 1:
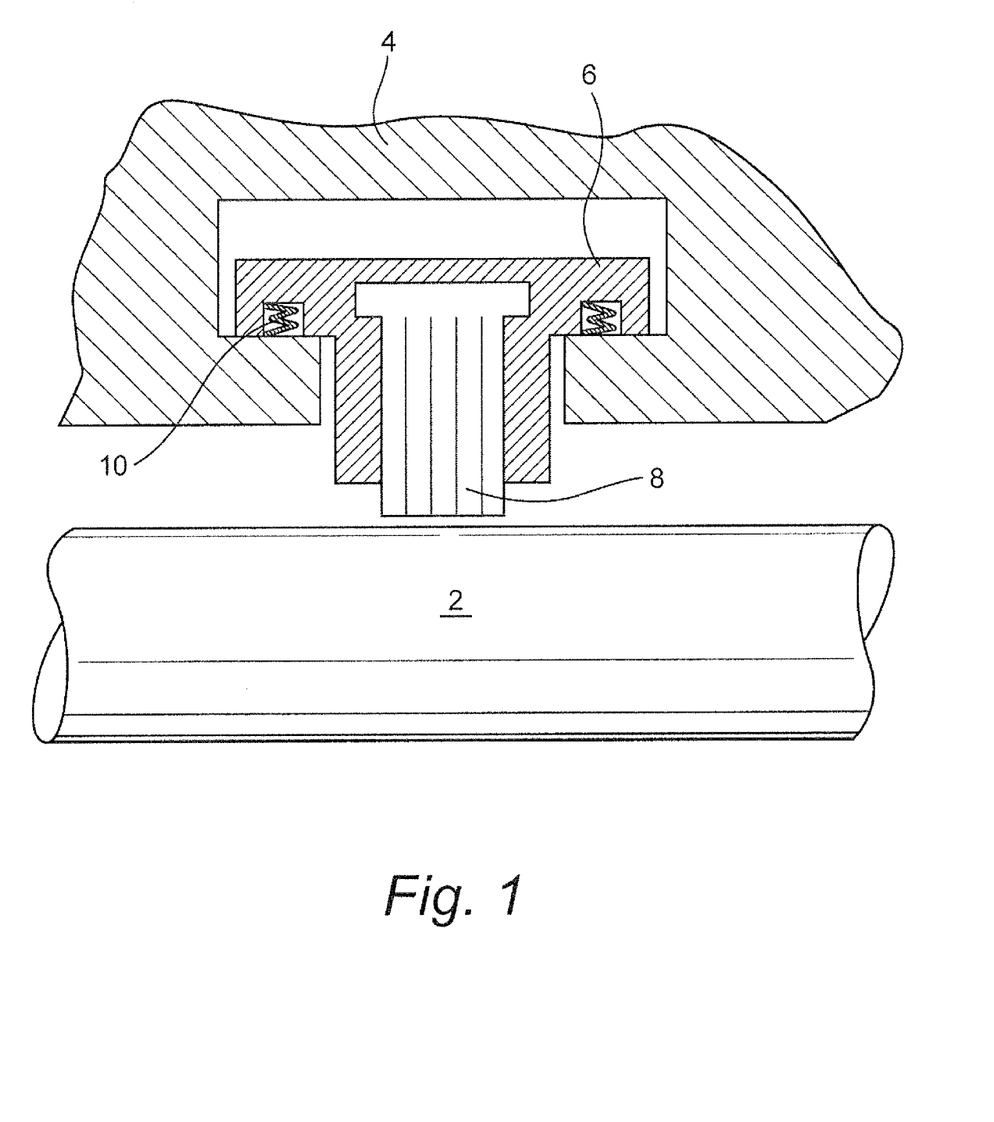
FIG. 1 depicts a retractable compliant plate seal according to an embodiment of the invention in the closed position.
Figure 2:
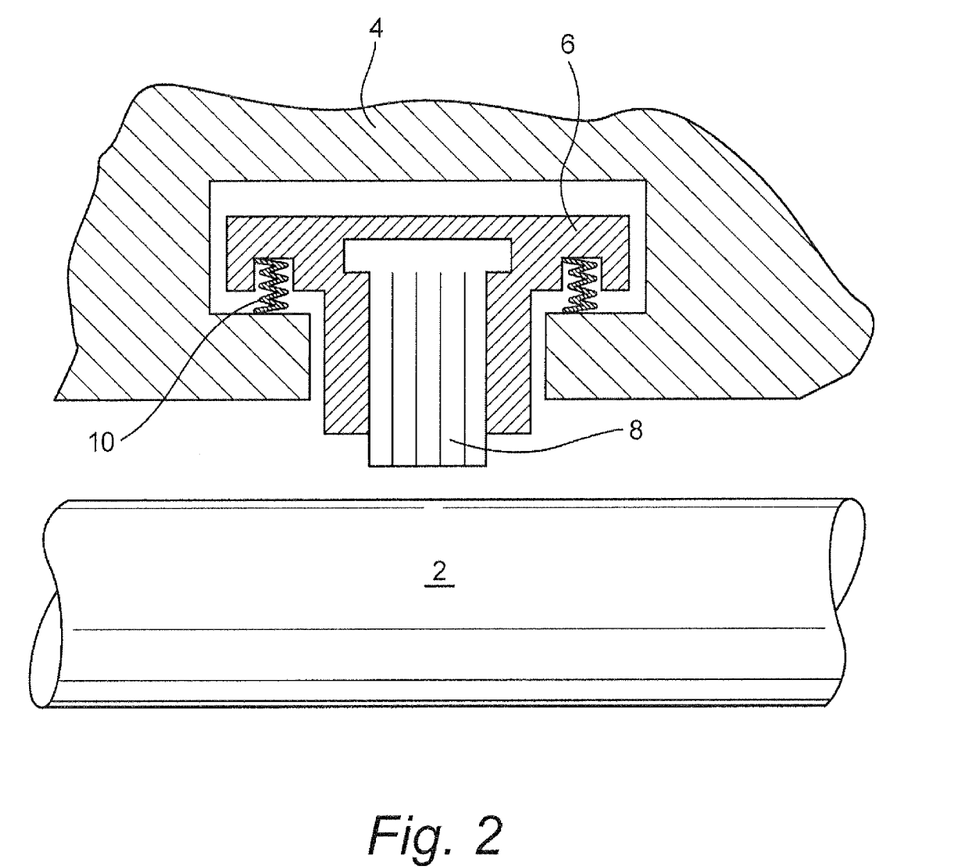
FIG. 2 discloses the retractable compliant plate seal of FIG. 1 in the open position.

Referring to FIGS. 1 and 2, a turbo-machine may include a rotor 2 and a stator 4 which rotationally supports the rotor 2. A compliant plate seal housing 6 is supported in the stator 4 in an adjustable position by a spring system 10. The compliant plate seal housing 6 supports a compliant plate seal 8, which may be, for example, a shingle seal. As shown in FIG. 2, the retractable compliant plate seal is in the open position and the spring system 10 biases the compliant plate seal housing 6 away from the rotor 2 so that the compliant plate seal 8 does not contact the rotor 2. During startup and shutdown of the turbo-machine, the fluid pressure inside the machine is insufficient to overcome the radially outward spring force of the spring system 10 which keeps the seals open. Since the compliant plate seal 8 is most susceptible to contacting the rotor 2 during such transient periods, retracting the compliant plate seal 8 leads to a large radial gap between the compliant plate seal 8 and the rotor 2, thus eliminating the possibility of contact. The lack of contact between the seal 8 and the rotor 2, in turn, prevents seal wear, heat generation and rotor-dynamic problems.

During steady-state operation, the ambient pressure in the machine builds up sufficiently high to generate forces that radially move the compliant plate seal 8 close to the rotor 2. This minimizes the gap between the compliant plate seal 8 and the rotor 2, resulting in good sealing characteristics during steady-state operation of the machine, and therefore improved machine thermodynamic efficiency.

Figure 3:
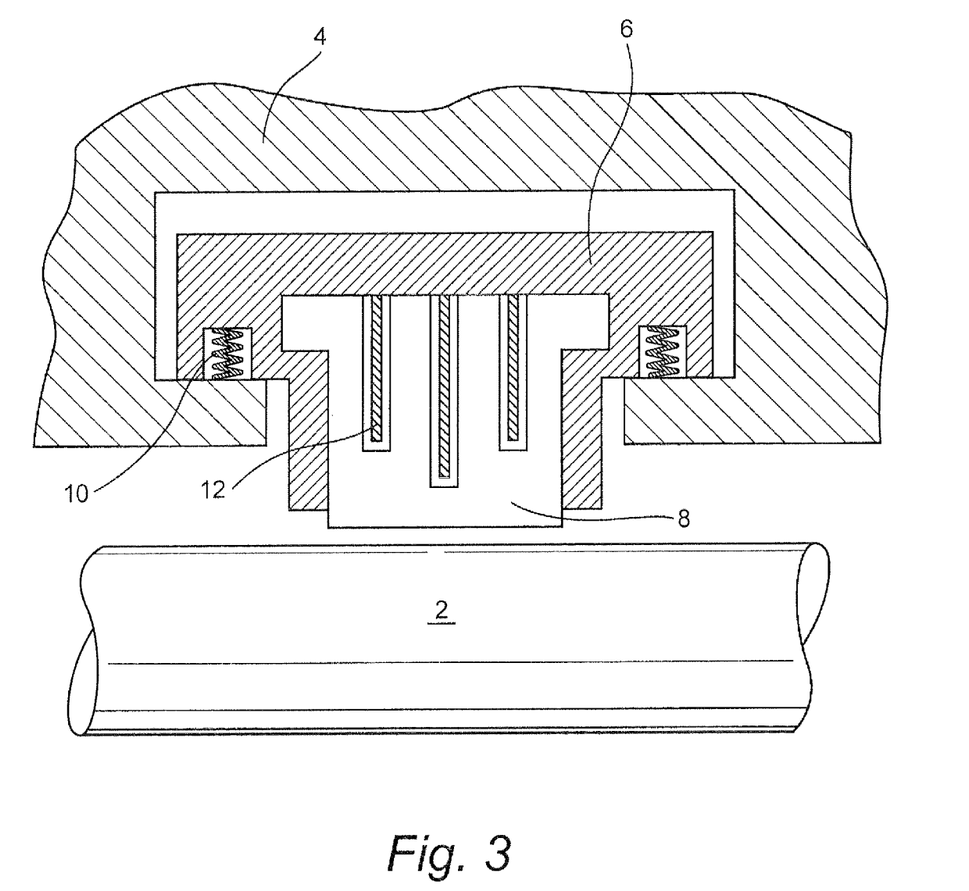
FIG. 3 depicts a retractable compliant plate seal according to another embodiment of the invention.

As shown in FIG. 3, in another embodiment of the invention, the compliant plate seal housing 6 supports the compliant plate seal 8. The compliant plate seal 8 includes axial flow restrictors 12 to restrict the flow in the axial direction of the turbo-machine.

Figure 4:
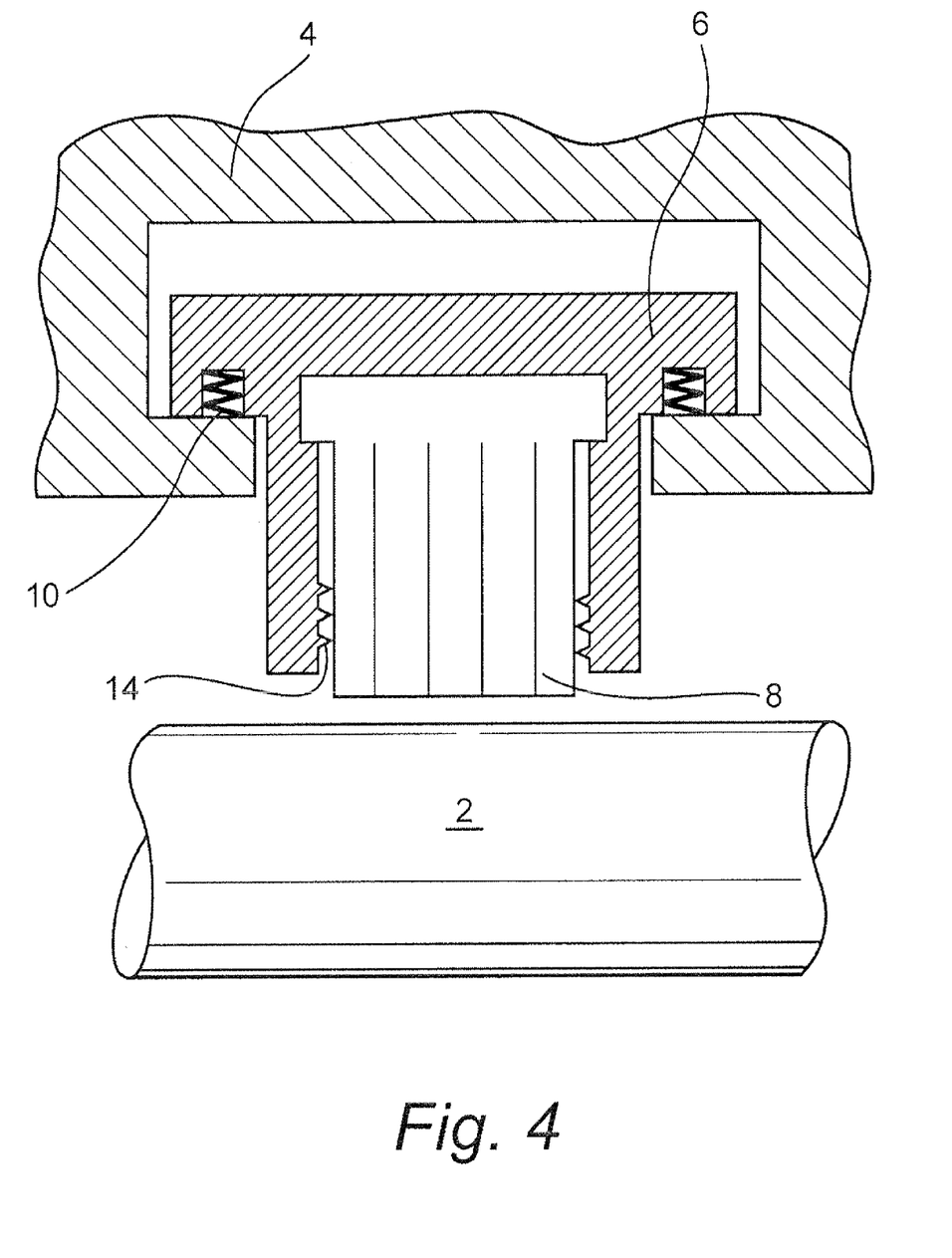
FIG. 4 depicts a retractable compliant plate seal in accordance with another embodiment of the invention.

Referring to FIG. 4, in another embodiment of the invention, the compliant plate seal housing 6 supports the compliant plate seal 8 and radial flow restrictors 14 are provided in the compliant plate seal housing 6 to restrict radial flow in the turbo-machine.

Figure 5:
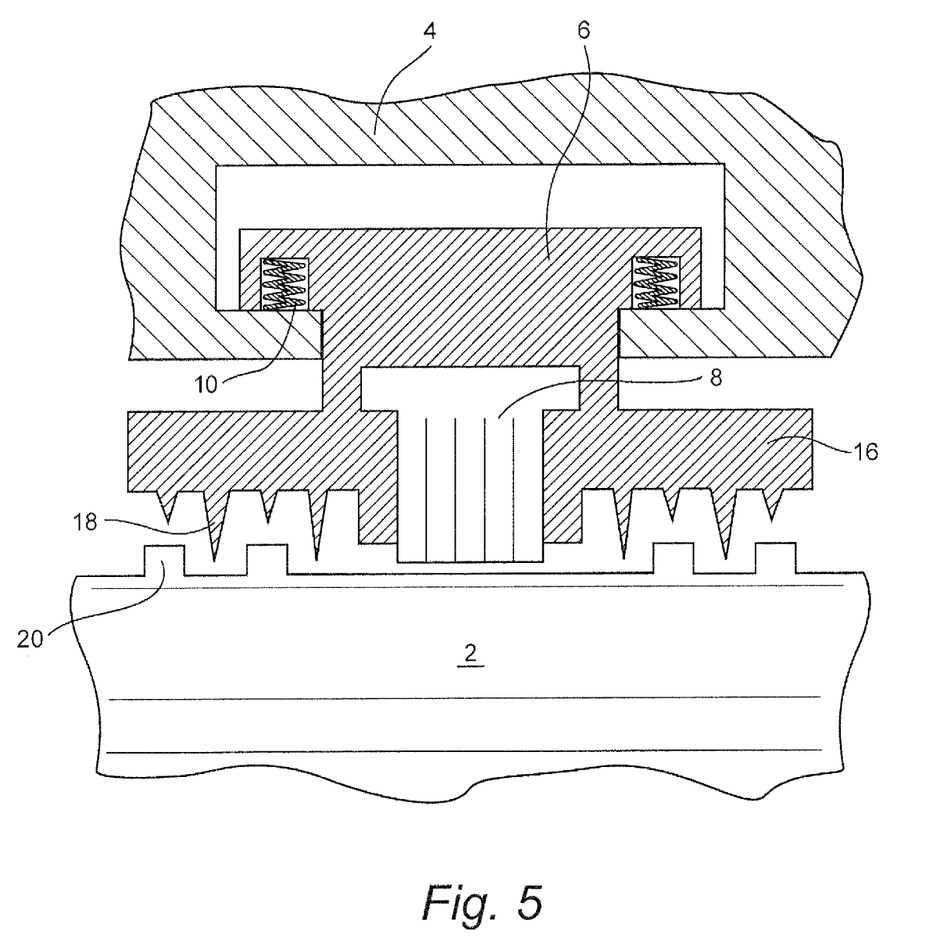
FIG. 5 discloses a retractable compliant plate seal according to another embodiment of the invention.

According to another embodiment of the invention, shown in FIG. 5, the compliant plate seal housing 6 is provided with a retractable labyrinth seal 16. The compliant plate seal 8 is supported by the retractable labyrinth seal 16. The retractable labyrinth seal 16 includes high-low labyrinth teeth 18 which oppose the rotor surface. The rotor surface may include a series of high and low lands 20 to create a labyrinthine flow passage between the seal and the rotor 2.

Figure 6:
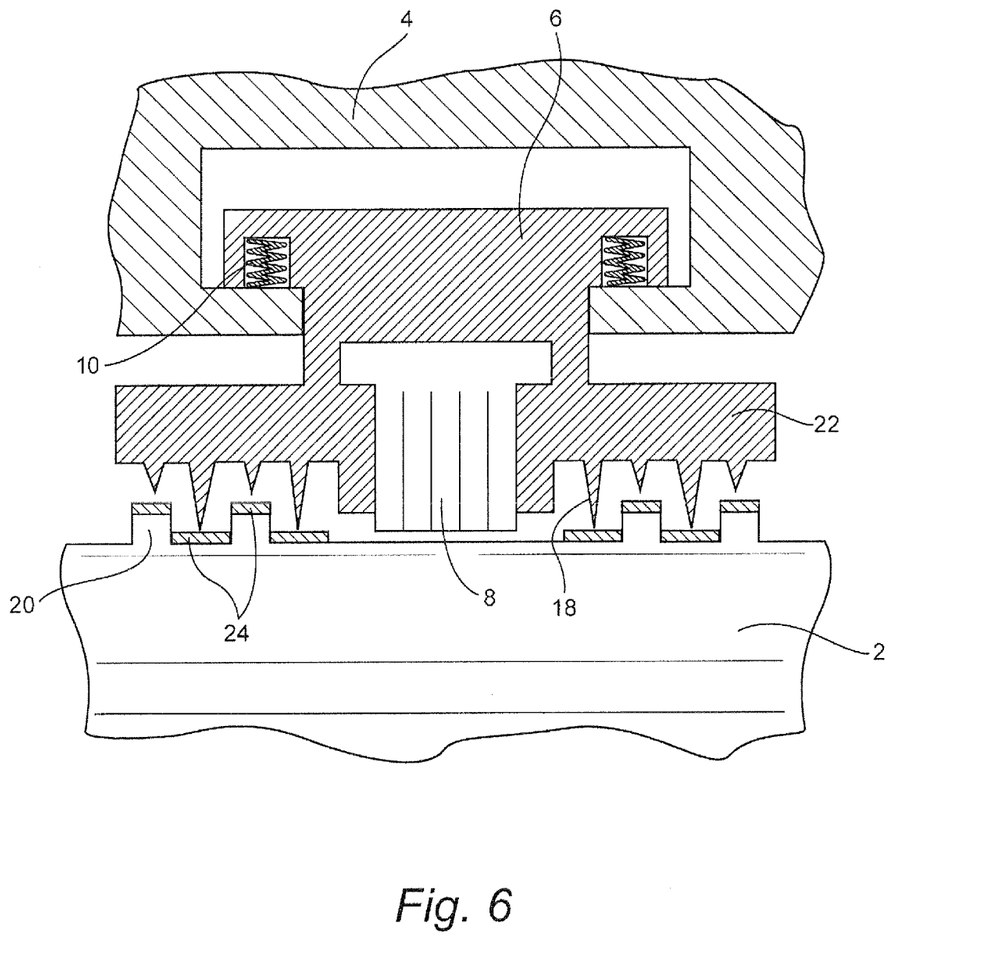
FIG. 6 depicts a retractable compliant plate seal in accordance with another embodiment of the invention.

As shown in FIG. 6, according to another embodiment of the invention, the compliant plate seal housing 6 may include a retractable abradable seal 22 which supports the compliant plate seal 8. The retractable abradable seal 22 includes high-low labyrinth teeth 18 which oppose lands 20 provided on the rotor 2. An abradable coating 24 may be provided on the lands 20 of the rotor 2.

Figure 7:
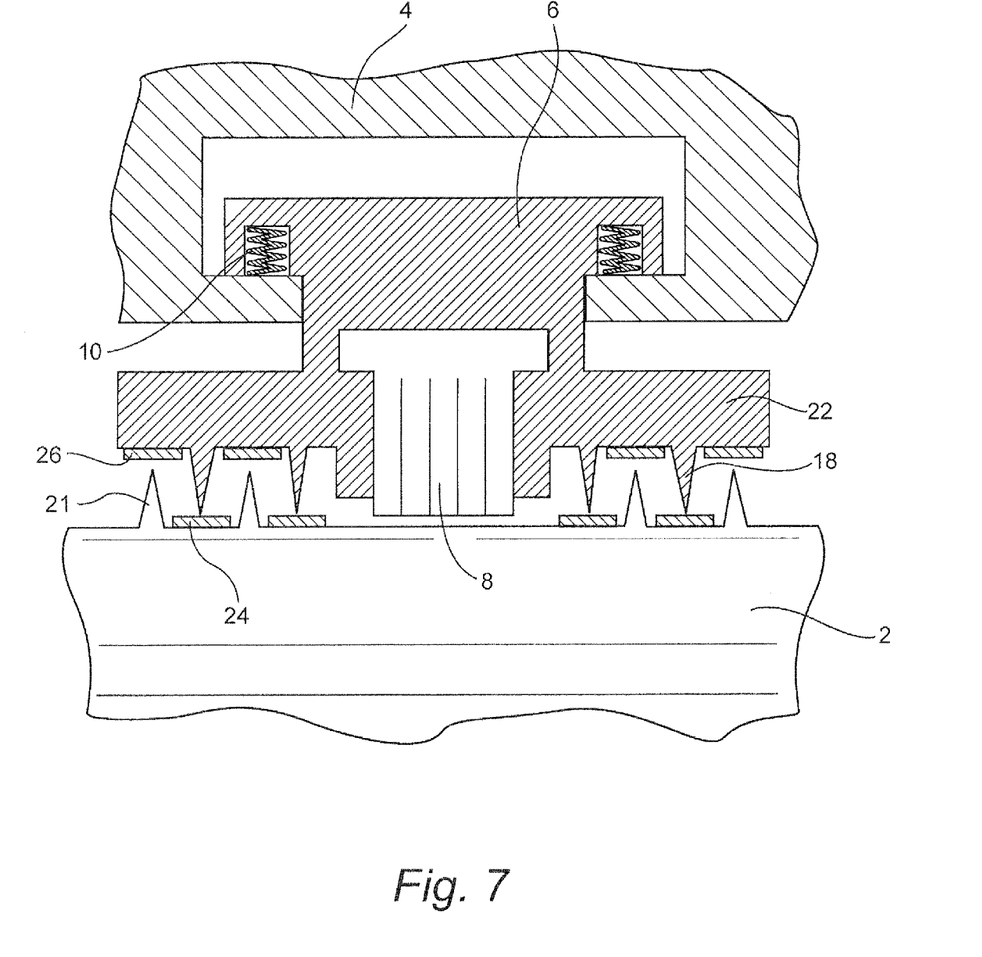
FIG. 7 depicts a retractable compliant plate seal in accordance with another embodiment of the invention.

Referring to FIG. 7, in another embodiment of the invention, the retractable abradable seal 22 of the compliant plate seal housing 6 may be provided with an abradable coating 26 between the labyrinth teeth 18. The abradable coating 26 on the retractable abradable seal 22 are provided opposite to labyrinth teeth 21 provided on the rotor 2. The abradable coating 24 provided on the rotor 2 opposes the labyrinth teeth 18 provided on the retractable abradable seal 22. It should be appreciated that the rotor 2 may not include an abradable coating.

Figure 8:
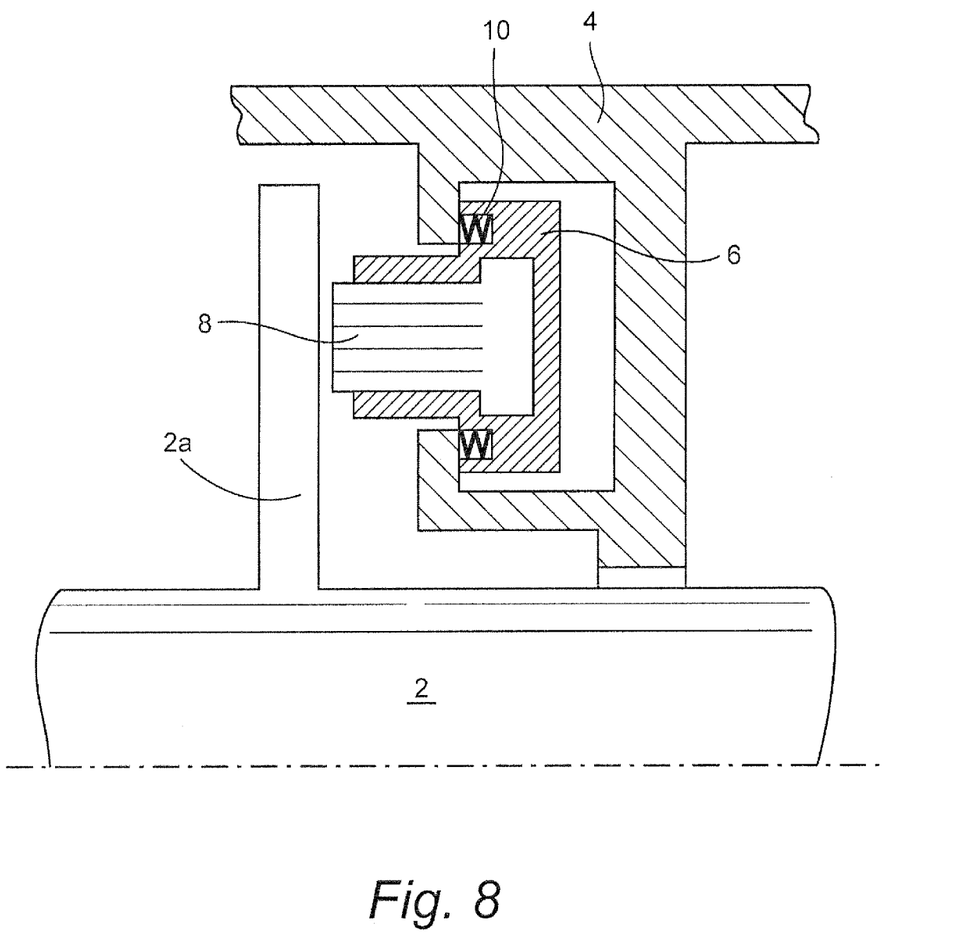
FIG. 8 depicts a retractable compliant plate seal in accordance with another embodiment of the invention.

As shown in FIG. 8, the rotor 2 may include a rotor axial face 2a which opposes the compliant plate seal 8 supported in the compliant plate seal housing 6. The spring system 10 is configured to bias the compliant plate seal housing 6 away from the rotor axial face 2a, along the turbo-machine axial direction.

Figure 9:
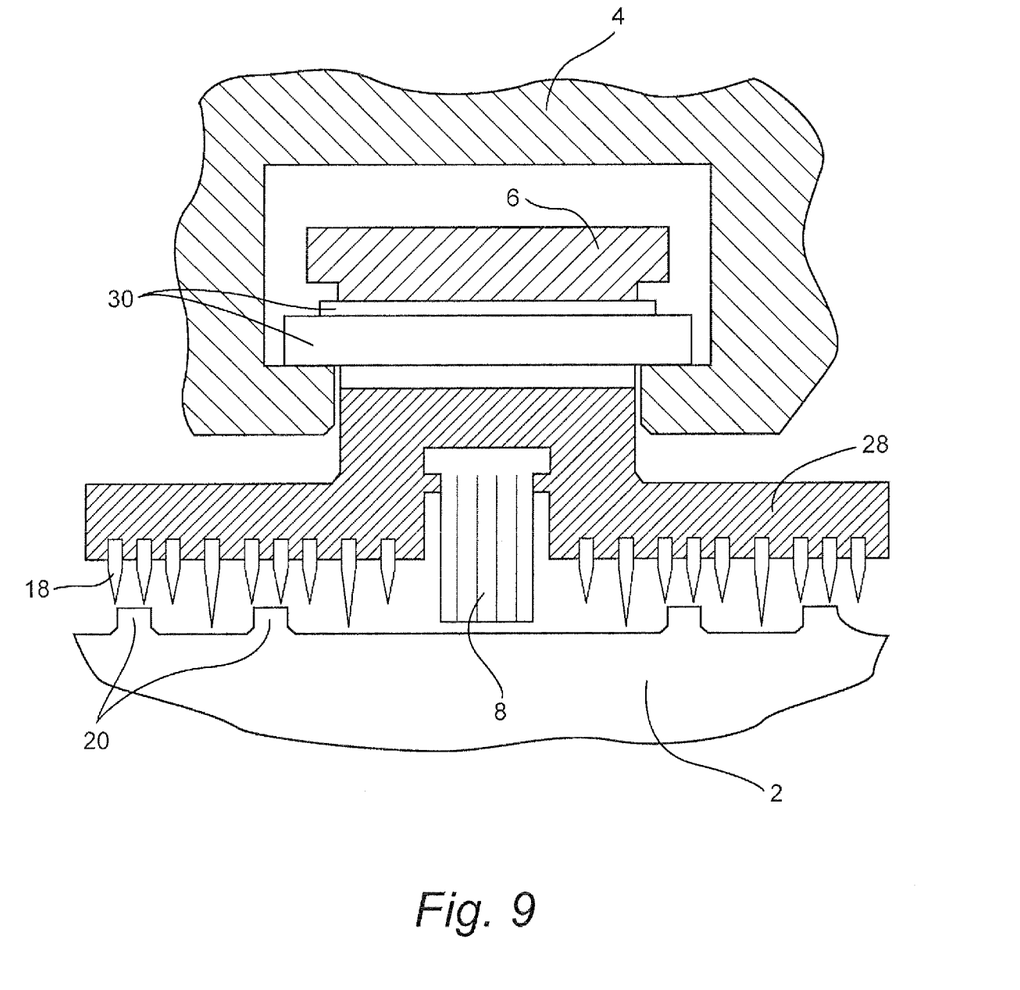
FIG. 9 depicts a retractable compliant plate seal in accordance with another embodiment of the invention.

As shown in FIG. 9, in another embodiment of the invention, the compliant plate seal housing 6 may be radially adjustable by an actuator 30 to adjust the spacing between an adjustable labyrinth seal 28 of the compliant plate seal housing 6 and the rotor 2. The adjustable labyrinth seal 28 includes labyrinth teeth 18 that oppose lands 20 provided on the rotor 2. The actuator 30 may be an externally pressurized pneumatic actuator, for example, capable of holding the compliant plate seal 8 open whenever necessary. Furthermore, it should be appreciated that the actuator may be a combination of a spring system and an actuator, for example, a fluidic actuator. It should also be appreciated that the seal 28 may not include labyrinth teeth and the seal 28 may be operated only as an actuated compliant seal.

Figure 10:
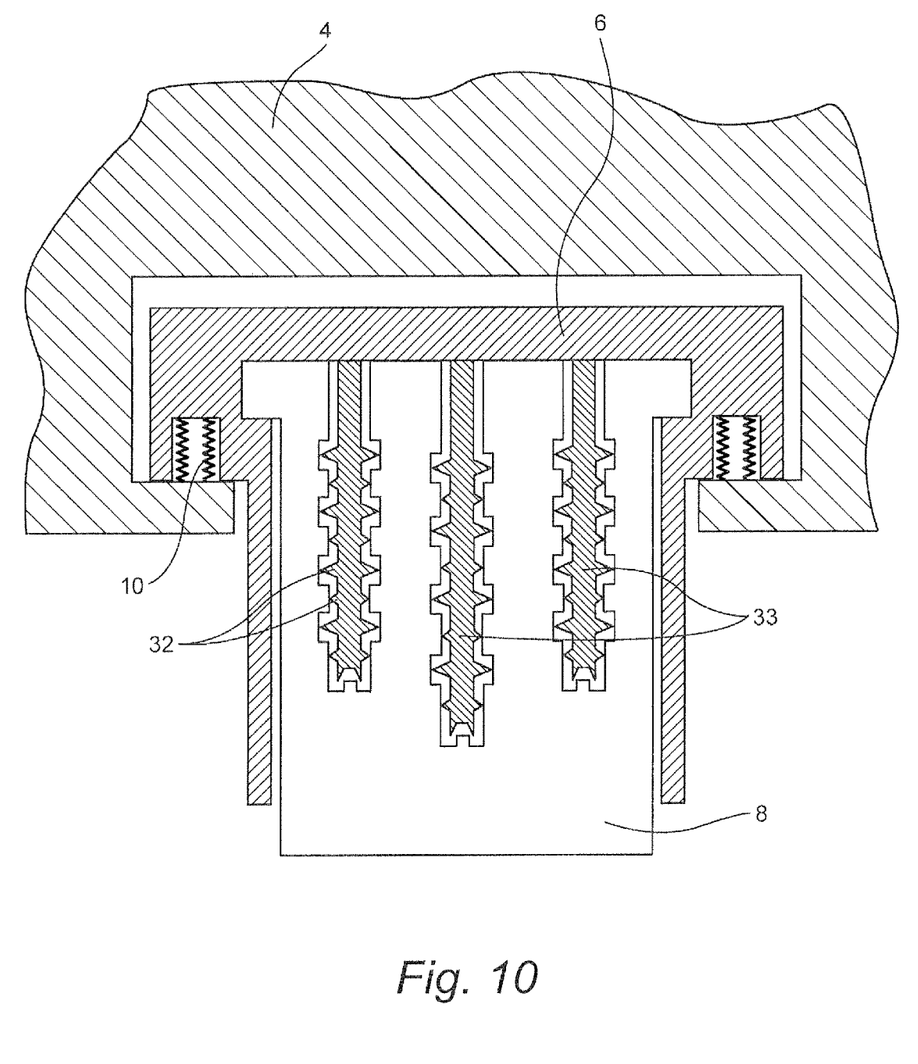
FIG. 10 depicts a retractable compliant plate seal in accordance with another embodiment of the invention.

Referring to FIG. 10, the compliant plate seal housing 6 may support a compliant plate seal 8 that includes a plurality of radial and axial flow restrictors 32 and 33, respectively, configured to restrict the high pressure fluid leakage from the high pressure side to the low pressure side in the turbo-machine.

Figure 11:
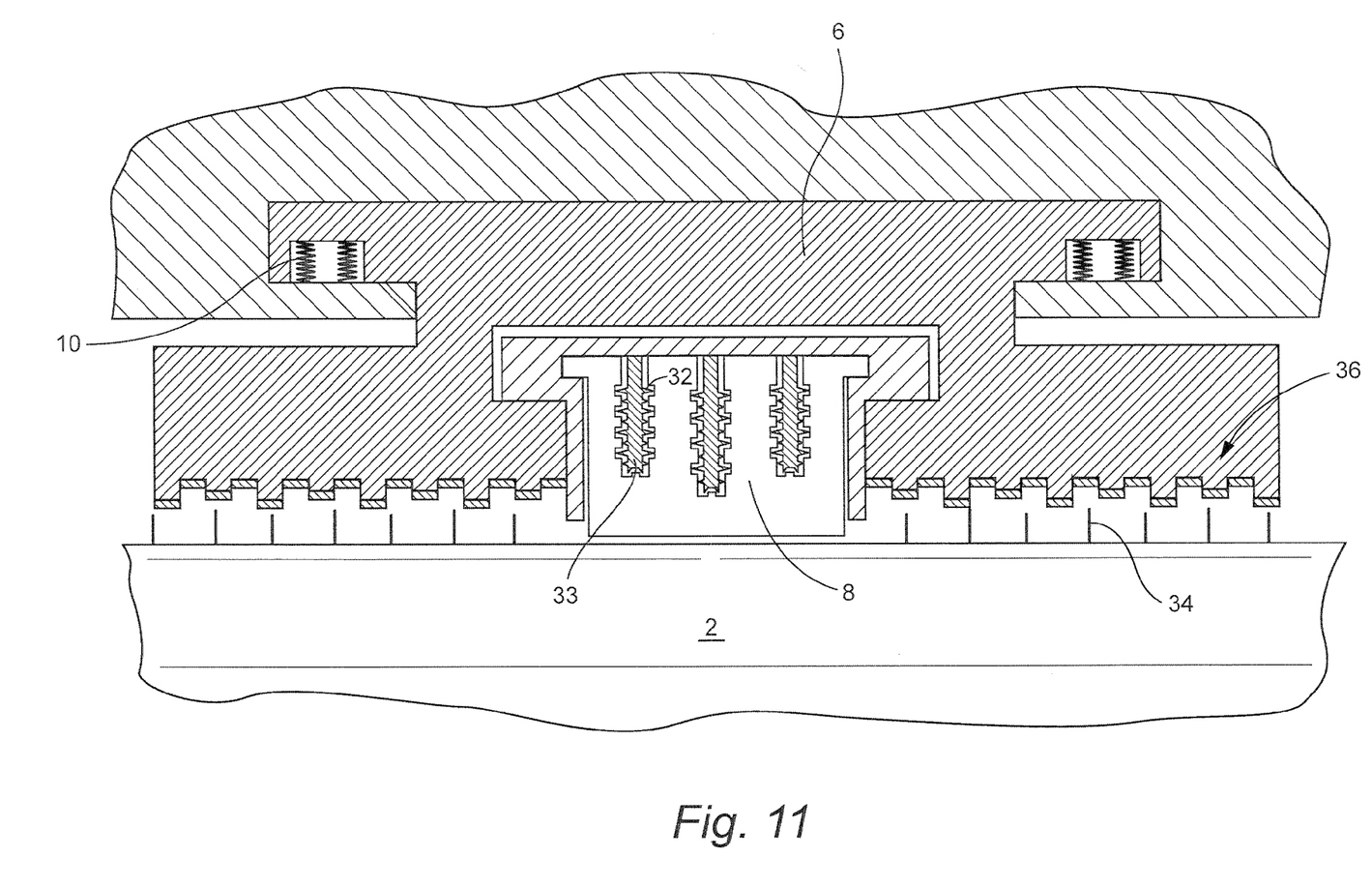
FIG. 11 depicts a retractable compliant plate seal in accordance with another embodiment of the invention.

Referring to FIG. 11, in another embodiment of the invention, the compliant plate seal housing 6 may support the compliant plate seal 8 having a plurality of radial and axial flow restrictors 32 and 33, respectively. The rotor 32 may be provided with caulked strips 34 that oppose the compliant plate seal housing 6. The compliant plate seal housing 6 may include an abradable coated seal 36 that is opposite the caulked strips 34 of the rotor 2.

In the embodiments discussed above, the compliant plate seal 8 may be comprised of axially staggered compliant plates, referred to as shingles, that impede leakage flow. The axial flow restrictors may incorporate axial flow restricting members, such as intermediate rings or plates, that force the leakage to follow a tortuous path as it flows axially along the seal, thereby improving the sealing performance. The radial flow restrictors discussed in the embodiments above may be incorporated within the side plates or intermediate plates of the seal that cause the leakage to follow a tortuous path as it flows radially along these plates, thereby also improving sealing performance.

In each of the embodiments discussed above, the use of the spring system and/or the actuator moves the seal segments away from the rotor, especially during startup and shutdown periods, to reduce, or eliminate, the possibility of contact between the tips of the compliant seal and the rotor. The embodiments discussed above thus provide enhanced seal life, as well as enhanced machine performance and reliability.

The embodiments discussed above may be integrated with an existing standard seal such a labyrinth (e.g. high-low) slant-tooth, interlocking tooth, or Vernier packing rings. It should also be appreciated that the compliant plate seal embodiments of the invention discussed above may be incorporated within an abradable or labyrinth seal or the compliant plate seals of the embodiments discussed above may be provided to a turbo-machine as a stand-alone configuration.

The embodiments discussed above are applicable to all types of compliant plate seals, including, but not limited to, shingle seal, compliant seal with axial flow restrictors, compliant plate seals with radial flow restrictors, and tapered compliant plate seals. The embodiments discussed above are also applicable to radial, as well as axial, sealing configurations. Moreover, in an axial sealing configuration, the embodiments discussed above are also applicable to segmented, as well unsegmented, seals.

The embodiments discussed above may also be implemented at any sealing location where stationary and rotating parts are in close proximity, including, but not limited to, end packings, interstage rotor sealing, bucket/shroud tip sealing, and nozzle/stator root sealing.

It should also be appreciated that the embodiments discussed above are applicable to all turbo machinery, such as steam and gas turbines, compressors, and aircraft engines.

In the event that variable clearance positive pressure techniques are used to radially close the compliant plate seals, the embodiments of the invention discussed above may also incorporate communication holes that ensure that the high pressure, upstream of the seal, acts on the seal housing to close it.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal arrangement for sealing the space between a rotating element and a stationary element, the sealing arrangement comprising:

a compliant plate seal housing supported adjustably in the stationary element, the compliant plate seal housing supporting a compliant plate seal, the compliant plate seal comprising a plurality of compliant plates in facing relation to the stationary element, the compliant plates defining a sealing ring between the stationary element and the rotating element, each compliant plate comprising one or more slots therein, the compliant plate seal further comprising one or more corresponding axial flow restrictors provided in the one or more slots extending radially inward and between first and second side edges of each compliant plate, each axial flow restrictor comprising a ring extending circumferentially through and between a plurality of the compliant plates; and a spring system provided between the compliant plate seal housing and the stationary element to bias the compliant plate seal housing in a direction away from a surface of the rotating element.

2. The seal arrangement of claim 1, wherein the compliant plate seal further comprises radial flow restrictors.

3. The seal arrangement of claim 1, wherein the compliant plate seal housing further comprises a labyrinth seal.

4. The seal arrangement of claim 3, wherein the labyrinth seal of the compliant plate seal housing comprises high and low labyrinth teeth that oppose high and low lands provided on the rotating element.

5. The seal arrangement of claim 4, wherein the high and low lands of the rotor comprise an abradable coating.

6. The seal arrangement of claim 5, wherein the labyrinth seal of the compliant plate seal housing comprises an abradable coating.

7. The seal arrangement of claim 1, wherein the compliant plate seal opposes an axial face of the rotating element.

8. The seal arrangement of claim 1, wherein the compliant plate seal opposes a radial face of the rotating element.

9. The seal arrangement of claim 1, wherein the rotating element comprises caulked strips opposing an abradable coating provided on the compliant plate seal housing.

10. A seal arrangement for sealing the space between a rotating element and a stationary element, the sealing arrangement comprising:

a compliant plate seal housing supported adjustably in the stationary element, the compliant plate seal housing supporting a compliant plate seal, the compliant plate seal comprising a plurality of compliant plates in facing relation to the stationary element, the compliant plates defining a sealing ring between the stationary element and the rotating element, each compliant plate comprising one or more slots therein, the compliant plate seal further comprising one or more corresponding axial flow restrictors provided in the one or more slots extending radially inward and between the first and second side edges of each compliant plate, each axial flow restrictor comprising a ring extending circumferentially through and between a plurality of the compliant plates; and one or more actuators provided between the compliant plate seal housing and the stationary element to move the compliant plate seal housing in a direction away from a surface of the rotating element.

11. The seal arrangement of claim 10, wherein the one or more actuators comprises a pneumatic actuator, a hydraulic actuator, and/or a spring.

12. The seal arrangement of claim 10, wherein the compliant plate seal further comprises radial flow restrictors.

13. The seal arrangement of claim 10, wherein the compliant plate seal housing further comprises a labyrinth seal.

14. The seal arrangement of claim 13, wherein the labyrinth seal of the compliant plate seal housing comprises high and low labyrinth teeth that oppose labyrinth teeth provided on the rotating element.

15. The seal arrangement of claim 10, wherein the compliant plate seal opposes an axial face of the rotating element.

16. The seal arrangement of claim 10, wherein the compliant plate seal opposes a radial face of the rotating element.

17. The seal arrangement of claim 1, wherein each of the one or more slots comprises a portion having a first width and a second width, wherein the first width and the second width are different.

18. The seal arrangement of claim 10, wherein each of the one or more slots comprises a portion having a first width and a second width, wherein the first width and the second width are different.

* * * * *